Patented Aug. 22, 1950

2,520,093

UNITED STATES PATENT OFFICE 2,520,093

MANUFACTURE OF 3-DIALKYLAMINO-2-HYDROXY-PROPYL AMINES

Walter Dale Gross, Wyandotte, Mich., assignor to Sharples Chemicals Inc., Philadelphia, Pa., a corporation of Delaware No Drawing. Application July 26, 1946, Serial No. 686,432

7 Claims. (Cl. 260—584)

The present invention relates to the production of 3-dialkylamino-2-hydroxypropylamines. In particular it relates to an improvement in the process of preparing said compounds by ammonation of the corresponding dialkylaminoepoxypropanes.

The process to which the improvement of this invention applies is described in Patent 1,790,042 to Eisleb, and involves essentially the reactions of the following equations:

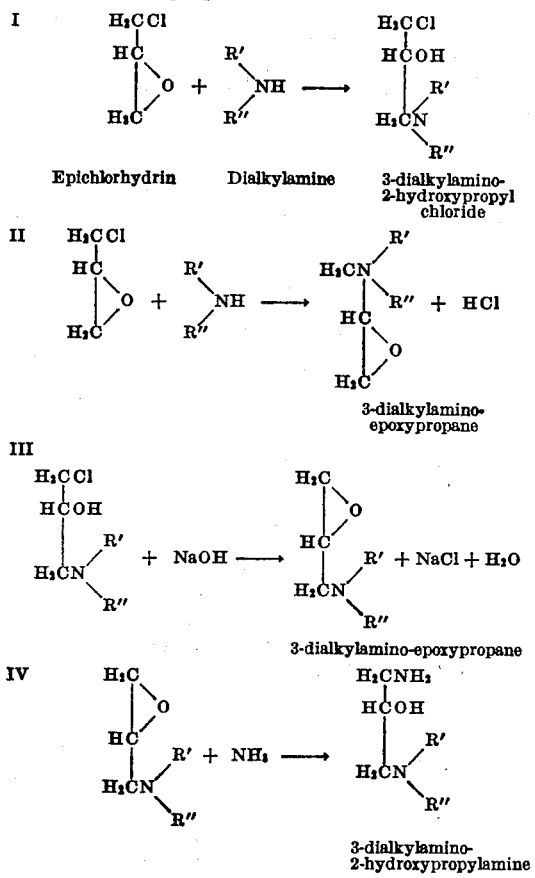

wherein R' and R" are alkyl groups.

In practice of the prior art, the amine and the epichlorhydrin in approximately equivalent proportions were mixed together in a reaction vessel provided with agitation and suitable means for removing the heat of reaction and maintaining the reaction mixture at an appropriate temperature. At the completion of the condensations of Equations I and II, the crude product was treated with aqueous caustic soda or other base to effect the reaction of Equation III, and an oil layer free of salts separated from an aqueous layer free of product. The dialkylaminoepoxypropane was then isolated by fractional distillation of the oil layer under vacuum, and ammonated at somewhat elevated temperatures.

In the practice of the present invention, as in the practice of the prior art, the dialkylamine is reacted with the epichlorhydrin, and the resulting reaction mixture is subjected to treatment with a base. In this invention, as in the prior art, the fundamental reactions preliminary to ammonation thus include the reactions of the foregoing Equations I-III. In the conduct of the first step of reacting the dialkylamine with epichlorhydrin, this reaction can be advantageously promoted by incorporating a non-reacting diluent with the reactants. This invention is not, however, limited to use of a non-reacting diluent in this first step of the reaction, or to any other features which may be employed in the initial reaction between the dialkylamine and the epichlorhydrin.

Even by the use of the most effective conditions employed in the prior art, it has been impossible to obtain yields of the dialkylaminoepoxypropane much in excess of 60% based on epichlorhydrin, and the oil layer formed by the treatment of Equation III always contains relatively large proportions of by-products. Said contaminating products usually include unreacted amine, epichlorhydrin polymers and bis-dialkylaminopropanols together with substances of unknown character.

In the ammonation of dialkylaminoepoxypropanes produced by the sequence illustrated in its essentials by Equations I-III, it has always been considered necessary to subject the crude, causticized aminoepoxide to a process of purification by distillation of said aminoepoxide overhead prior to ammonation.

I have now discovered that ammonation of the crude, dialkylaminoepoxypropane-containing oil layer resulting from the reaction of Equation III results in substantial improvement in the yield of the corresponding dialkylaminohydroxypropylamine.

By the practice of the invention, epichlorhydrin and diethylamine, for example, may be converted to diethylaminohydroxypropylamine in yields of about 45% whereas, by the procedure of the prior art, optimum yields approximate 35%. Regardless of the particular dialkyl amine used, however, and regardless of the details of procedure employed in conducting the three foregoing fundamental reactions, practice of the present invention provides simplification of the process and enhancement of overall yields as compared with a similarly conducted process which includes the additional step of separating relatively pure dialkylaminoepoxypropane before ammonation.

Best results in the step of Equations I and II are obtained when the reaction between the epichlorhydrin and the dialkyl amine is conducted at a controlled and reasonably uniform temperature between about 15° C. and 75° C., excellent and consistent results being readily realized by conducting said reaction in the presence of a non-reacting diluent, especially one which boils at or a little below the desired temperature of reaction whereby the heat of reaction may be dissipated at constant temperature by vaporization of the diluent.

The ammonation of the crude aminoepoxypropane after treatment with the base is suitably carried out in a pressure vessel equipped with agitator and means for heating the reactants. A substantial excess of aqueous or alcoholic ammonia may be mixed with the crude, undistilled aminoepoxide and reacted at about 100° C. for about two hours. The dialkylaminohydroxypropylamine may then be isolated in pure condition by fractional distillation under vacuum.

If aquammonia is employed it may suitably contain about 30% ammonia, but more dilute or more concentrated solutions may be employed. Yields increase somewhat as the ratio of ammonia to the aminoepoxide is increased, the practical optimum ratio depending mainly on economic considerations. A ratio of ammonia to epoxide of 10:1 gives satisfactory results, but ratios as low as 2:1 may be used.

Preferred temperatures for the ammonation reaction are between 50° C. and 150° C., the range from 75° C. to 125° C. being best. Reaction periods of about two hours are sufficient at 100° C. but will, of course, vary widely depending mainly upon the temperature employed.

The amines which may be used advantageously in the preparation of the substituted aminohydroxypropylamines by the process of the present invention include all the amines capable of undergoing reactions I and II and in which the nitrogen atom is substituted by two alkyl groups or the equivalent. Examples are dimethyl-, diethyl-, diisopropyl-, di-n-propyl-, dibutyl-, diamyl-, dihexyl-amines, piperidine, etc. Amines containing mixed alkyl groups such as methylethylamine and ethylbutylamine are also suitable. Of particular value, however, are dialkylamines containing from 1 to 5 carbon atoms in each alkyl group, and especially diethylamine.

The oil layer obtained after causticization of the reaction product of the dialkylamine with the epichlorhydrin will contain, as has been said, a large proportion of reaction by-products. It may also contain hydrocarbon or other non-reacting diluent employed to facilitate the reaction. In either instance, however, the whole oil layer may be ammonated without other purification than substantial separation of the accompanying aqueous phase, simple subsidence and decantation being generally adequate for this purpose. Alternatively, however, the oil layer may be subjected if desired to various other treatments prior to ammonation without detriment providing the dialkylaminoepoxypropane contained in the oil layer is not itself distilled. If a non-reacting diluent is employed for example, this diluent may be removed by distillation before the crude 3-dialkylaminoepoxypropane fraction is ammonated.

The following examples further illustrate the practice of the invention, the scope of which, however, is limited only by the appended claims.

The examples provide a comparison between yields of 3-dialkylamino-2-hydroxypropylamines obtainable by the best conditions of the prior art, and yields obtainable by practice of the present invention. Example 1 illustrates results obtainable without practice of the present invention, and Example 2 illustrates the improved results obtainable when the present invention is employed.

*Example 1*

A 50 gallon reaction kettle which was steam and water jacketed, and equipped with a stirrer, thermometer well, and reflux condenser, was charged with 61.5 pounds of diethylamine (98%), 21 pounds of hexane, and 35 pounds of pentane, and 75 pounds of epichlorhydrin were poured in. The reaction mass was warmed and the temperature held between 45° and 49° C. for four hours. It was then cooled to 20° C. and 83.5 pounds of 50% aqueous NaOH were added during a 20 minute period, and then reacted at 28° C. with stirring for two hours. The mixture was then diluted with 65 pounds of water, and allowed to separate into two layers. The upper layer, which contained the 1-diethylamino-2,3-epoxypropane, was separated and fractionated in a 4 foot packed column. The fraction which distilled between 50–55° C. at 15 mm. was 3-diethylaminoepoxypropane and represented a 59.5% conversion based on epichlorhydrin.

Into a 2 gallon autoclave, equipped with a stirrer, were charged 2720 cc. of water, 885 grams of distilled 3-diethylaminoepoxypropane, and 1170 grams of ammonia. The mixture was heated at 100° C. and reacted at that temperature for two hours. Fractionation of the product in a 4 foot packed column gave a cut of 3-diethylamino-2-hydroxypropylamine distilling between 105–115° C. at 15 mm. which amounted to a 58.1% conversion. Based on epichlorhydrin the overall conversion was 34.6%.

*Example 2*

Diethylamine (1054 grams) was reacted with epichlorhydrin (1270 grams) as in Example 1, a pentane - hexane hydrocarbon mixture (940 grams) being employed as a diluent, and the reaction mixture was then treated with caustic soda solution and separated into aqueous and oil layers as in Example 1. The oil layer was separated into two equal portions and one portion was distilled to determine the quantity of 3-diethylaminoepoxypropane obtainable therefrom. The conversion to 3-diethylaminoepoxypropane was found to be 59.2%, based on epichlorhydrin. By comparison of this figure with the result obtained in the practice of the first paragraph of Example 1, it will be seen that the oil layer of Example 2 was almost identical with the oil layer of Example 1.

The undistilled portion of the oil layer separated from the aqueous layer of the present example was charged directly into a 2 gallon autoclave together with 2714 cc. of water and 1166 grams of ammonia. The ammonation reaction was conducted at 100° C. for two hours. On distillation of the ammonation reaction mixture it was found that the conversion to 3-diethylamino-2-hydroxypropylamine based on epichlorhydrin was 46%.

2,520,093

I claim:
1. A process comprising reacting with epichlorhydrin a compound of the group consisting of secondary alkyl amines having less than 7 carbon atoms in each alkyl radical and piperidine, treating the reaction mixture with an aqueous solution of an inorganic base to form a plurality of phases including an oil phase, separating said oil phase, and thereafter treating said oil phase with an excess of ammonia at a temperature between 50° C. and 150° C. to form the desired product.

2. In the manufacture of 3-dialkylamino-2-hydroxypropylamines, the process comprising reacting a secondary alkyl amine having less than 7 carbon atoms in each alkyl radical with epichlorhydrin, treating the resulting mixture with an aqueous solution of an inorganic base to form an oil layer containing the corresponding dialkylaminoepoxypropane, and thereafter ammonating the undistilled dialkylaminoepoxypropane with a stoichiometric excess of ammonia at a temperature between 50° C. and 150° C.

3. In the manufacture of 3-dialkylamino-2-hydroxypropylamines, the process comprising reacting a secondary alkyl amine containing from 1 to 5 carbon atoms in each alkyl radical with epichlorhydrin, treating the resulting mixture with an aqueous solution of sodium hydroxide to form an oil layer containing the corresponding dialkylaminoepoxypropane, and thereafter ammonating the undistilled dialkylaminoepoxypropane with a stoichiometric excess of ammonia at a temperature between 50° C. and 150° C.

4. In the manufacture of 3-diethylamino-2-hydroxypropylamines, the process comprising reacting diethylamine with epichlorhydrin, treating the resulting mixture with an aqueous solution of an inorganic base to form an oil layer containing the corresponding diethylaminoepoxypropane, and thereafter ammonating the undistilled diethylaminoepoxypropane with a stoichiometric excess of ammonia at a temperature between 50° C. and 150° C.

5. In the manufacture of 3-dialkylamino-2-hydroxypropylamines, the process comprising reacting a secondary alkyl amine having less than 7 carbon atoms in each alkyl radical with epichlorhydrin in the presence of a non-reacting solvent, treating the resulting mixture with an aqueous solution of an inorganic base to form an oil layer containing the corresponding dialkylaminoepoxypropane, and thereafter ammonating the crude dialkylaminoepoxypropane-containing fraction so obtained with a stoichiometric excess of ammonia at a temperature between 50° C. and 150° C.

6. In the manufacture of 3-dialkylamino-2-hydroxypropylamines, the process comprising reacting a secondary alkyl amine containing from 1 to 5 carbon atoms in each alkyl radical with epichlorhydrin in the presence of a non-reacting solvent, treating the resulting mixture with an aqueous solution of sodium hydroxide to form an oil layer containing the corresponding dialkylaminoepoxypropane, and thereafter ammonating the crude dialkylaminoepoxypropane-containing fraction so obtained with a stoichiometric excess of ammonia at a temperature between 50° C. and 150° C.

7. In the manufacture of 3-diethylamino-2-hydroxypropylamines, the process comprising reacting diethylamine with epichlorhydrin in the presence of a non-reacting solvent, treating the resulting mixture with an aqueous solution of sodium hydroxide to form an oil layer containing the corresponding diethylaminoepoxypropane, and thereafter ammonating the crude diethylaminoepoxypropane-containing fraction so obtained with a stoichiometric excess of ammonia at a temperature between 50° C. and 150° C.

WALTER DALE GROSS.

REFERENCES CITED

The following references are of record in the file of this patent:

UNITED STATES PATENTS

| Number | Name | Date |
| --- | --- | --- |
| 1,790,042 | Eisleb | Jan. 27, 1931 |
| 1,985,885 | Bottoms | Jan. 1, 1935 |

OTHER REFERENCES

Drozdov et al., "Chemical Abstracts," volume 29, column 2148 (1935).

Drozdov et al., "Journal of General Chemistry" (U. S. S. R.), issue 7, pages 969–974 (1945).